United States Patent
Mehl

(10) Patent No.: US 9,476,573 B2
(45) Date of Patent: Oct. 25, 2016

(54) LIGHTING APPARATUS COMPRISING PHOSPHOR WHEEL

(71) Applicant: OSRAM GmbH, Munich (DE)

(72) Inventor: Oliver Mehl, Berlin (DE)

(73) Assignee: OSRAM GMBH, Munich (DE)

( * ) Notice: Subject to any disclaimer, the term of this patent is extended or adjusted under 35 U.S.C. 154(b) by 109 days.

(21) Appl. No.: 14/373,635

(22) PCT Filed: Jan. 8, 2013

(86) PCT No.: PCT/EP2013/050235
§ 371 (c)(1),
(2) Date: Jul. 22, 2014

(87) PCT Pub. No.: WO2013/110495
PCT Pub. Date: Aug. 1, 2013

(65) Prior Publication Data
US 2014/0369025 A1 Dec. 18, 2014

(30) Foreign Application Priority Data

Jan. 27, 2012 (DE) .................. 10 2012 201 192

(51) Int. Cl.
| | | |
|---|---|---|
| *F21V 14/08* | (2006.01) | |
| *G03B 21/20* | (2006.01) | |
| *G03B 33/06* | (2006.01) | |

(52) U.S. Cl.
CPC .............. *F21V 14/08* (2013.01); *G03B 21/204* (2013.01); *G03B 21/206* (2013.01); *G03B 33/06* (2013.01)

(58) Field of Classification Search
CPC ... F21V 14/18; G03B 21/204; G03B 21/206; G03B 33/06; G21K 9/56; F21K 9/58; F21K 9/56
USPC .................................................... 362/84, 283
See application file for complete search history.

(56) References Cited

U.S. PATENT DOCUMENTS

| | | | |
|---|---|---|---|
| 2002/0022766 A1 | 2/2002 | Adachi | |
| 2009/0027631 A1 | 1/2009 | Liu et al. | |
| 2009/0284148 A1 | 11/2009 | Iwanaga | |
| 2011/0249242 A1* | 10/2011 | Saitou .................. | G03B 21/204 353/98 |
| 2012/0062857 A1 | 3/2012 | Saitou et al. | |

FOREIGN PATENT DOCUMENTS

| | | |
|---|---|---|
| CN | 101581410 A | 11/2009 |
| CN | 101839463 A | 9/2010 |
| JP | 2011128522 A | 6/2011 |
| TW | 201033722 A | 9/2010 |
| WO | 2011092841 A1 | 8/2011 |

OTHER PUBLICATIONS

Chinese Office Action based on Application No. 2013800068506 (13 pages, 6 pages of translation thereof) mailed on Mar. 27, 2015 (for information purpose only).

\* cited by examiner

*Primary Examiner* — Laura Tso
*Assistant Examiner* — Naomi M Wolford
(74) *Attorney, Agent, or Firm* — Viering, Jentschura & Partner mbB

(57) ABSTRACT

Various embodiments relate to a lighting apparatus including at least one light generating device for generating primary light, and at least one phosphor wheel arranged optically downstream of the light generating device. The phosphor wheel may include at least one phosphor for wavelength conversion of the primary light into secondary light. A plurality of phosphor wheels are arranged optically downstream of the light generating device.

18 Claims, 1 Drawing Sheet

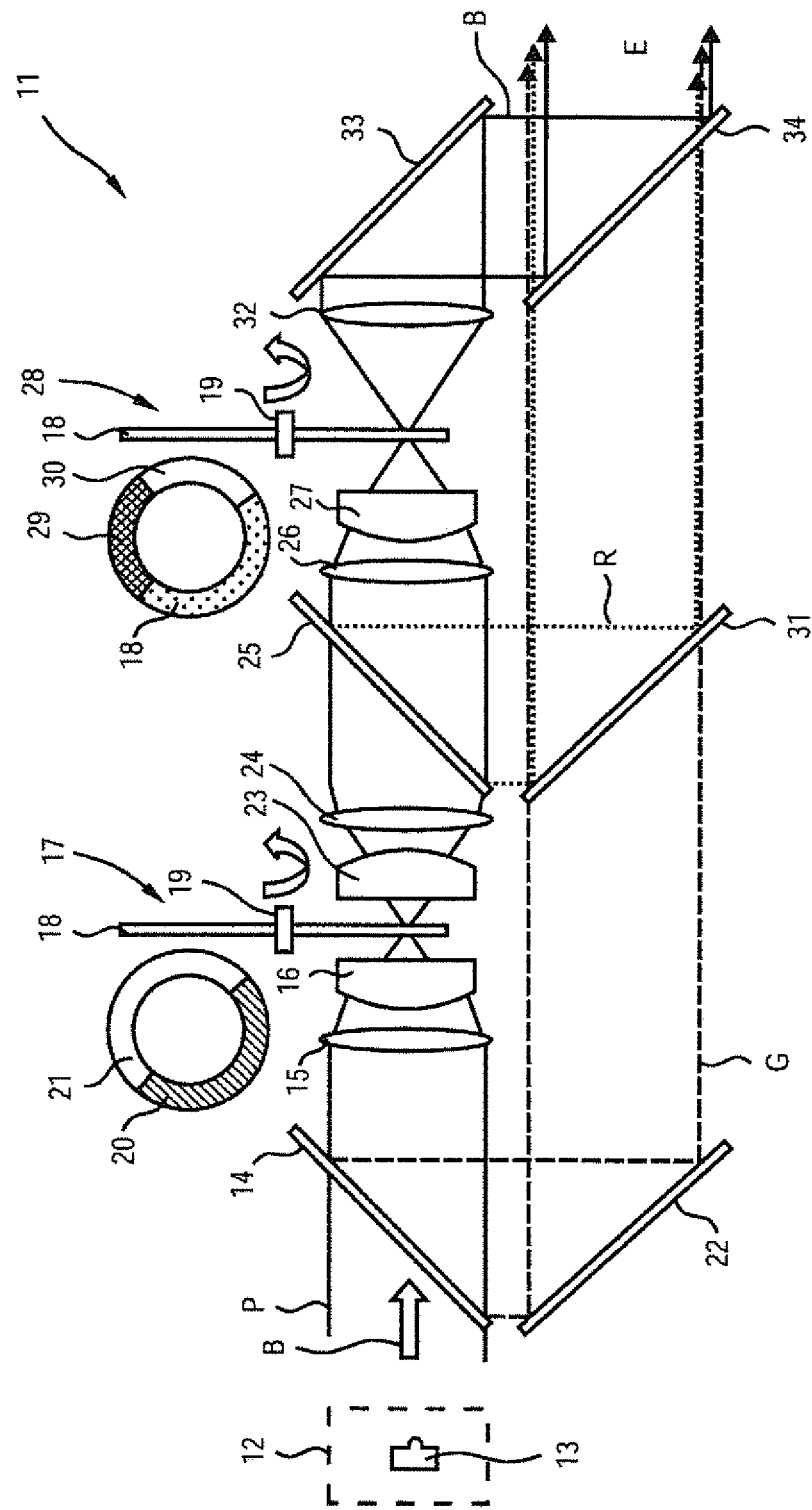

LIGHTING APPARATUS COMPRISING PHOSPHOR WHEEL

RELATED APPLICATIONS

The present application is a national stage entry according to 35 U.S.C. §371 of PCT application No.: PCT/EP2013/050235 filed on Jan. 8, 2013, which claims priority from German application No.: 10 2012 201 192.7 filed on Jan. 27, 2012, and is incorporated herein by reference in its entirety.

TECHNICAL FIELD

Various embodiments relate to a lighting apparatus including a light generating device for generating primary light, and including at least one phosphor wheel arranged optically downstream of the light generating device, which phosphor wheel includes at least one phosphor for wavelength conversion of the primary light into secondary light.

BACKGROUND

In projectors which use phosphors for light generation, it is conventional to use a laser and a rotating phosphor wheel arranged downstream of the laser (LARP: Laser Activated Remote Phosphor). The phosphor wheel typically includes a central driveshaft, which is driven by a motor.

The laser generates primary light, which is at least partially converted by phosphors located on the phosphor wheel into secondary light of longer wavelength (down-conversion). The phosphor wheel typically rotates with a constant angular velocity under a spatially fixed light spot of the primary light beam. By sufficiently rapid sequencing of the light components, the human eye can no longer resolve the individual color components and combination light is essentially generated, the sum color locus of which is given by a superposition of color loci of the individual color components. A component of the individual color components of primary light and secondary light is dictated primarily by an angular sector length of the phosphors on the phosphor wheel. Such projectors are known in principle and need not be described further here.

When the phosphor wheel is exposed, a certain power loss is generated in the phosphor, which is based for the most part on the so-called Stokes shift (which represents an energy difference of the photos between the absorbed and emitted radiation). This power loss leads to heating of the phosphor. The heat loss is dissipated by convection, radiant cooling and by thermal conduction of the carrier material of the phosphor wheel to the motor axle of the phosphor wheel, so that a stable operating temperature is established. Many phosphors (for example nitridic phosphors for the red spectral range) exhibit a conversion efficiency which is strongly dependent on an operating temperature. In order to increase and/or scale the output power of such projectors, a primary light power may be increased, although this also increases the heat loss. The operating temperature of the phosphor and of the phosphor wheel is thereby in turn increased. Owing to the temperature dependency of a conversion efficiency of phosphors, the overall efficiency of the light generation decreases with an increasing power.

This has previously been compensated for by increasing a wheel diameter of the phosphor wheel, since a larger surface area is then available for the thermal dissipation, and a reduction of the average power density is made possible. For instance, the wheel diameter is often increased from 33 mm to 40 mm, and now 55 mm or even 70 mm. Owing to the requirements in terms of the installation space and also in terms of the power of a motor of the phosphor wheel, however, there are limits to this concept.

As an alternative, a reduction of the average power loss can be achieved by generating a red light component not through wavelength conversion by means of a phosphor, but by means of a red light-emitting diode (LED). However, because of the luminous density of LEDs, which is limited in this case, a light flux increase to several thousand lumens is not possible, or is possible only with significant enlargement of an imaging unit, which is in turn associated with a superproportionally large cost increase.

SUMMARY

Various embodiments provide a lighting apparatus of the type mentioned in the introduction, which provides reduced heating of at least one of the phosphors by simple means.

Various embodiments provide a lighting apparatus, including at least one light generating device for generating primary light, and including at least one phosphor wheel arranged optically downstream of the light generating device, which phosphor wheel includes at least one phosphor for wavelength conversion of the primary light into secondary light, wherein a plurality of phosphor wheels are arranged optically downstream of the light generating device.

By the use of a plurality of phosphor wheels, phosphors may be distributed over different phosphor wheels and therefore thermally decoupled. The heat loss incurred at the phosphors can therefore be dissipated via a plurality of phosphor wheels, which significantly improves a thermal dissipation and consequently allows a reduction of a temperature rise of the phosphors. This in turn makes it possible, for example, to scale the power of the lighting apparatus into the range of several thousand lumens. Furthermore, the lighting apparatus can be implemented with simple means.

A phosphor wheel may, in particular, be understood as a rotatable plate which includes at least one phosphor region that can be exposed to the primary light. A phosphor region may comprise one or more phosphors. If the plate is a circular plate, a phosphor region may in particular be configured in the shape of a sector of a ring. Since the primary light shining onto the phosphor wheel typically generates a spatially fixed light spot there, a phosphor region rotates under the light spot. A color component of a light generated by the phosphor region is then proportional to an arc length of the phosphor region.

That a phosphor wheel is arranged optically downstream of the light generating device means, in particular, that the phosphor wheel is arranged in or after a light path of the primary light generated by the light generating device.

A rotational movement of the phosphor wheels is mutually synchronized. In particular, the phosphor wheels may occupy a predetermined rotational or angular position with respect to one another, and be rotated with the same angular velocity or speed of revolution. This allows a rigidly predetermined relative (angular) position of the phosphor wheels with respect to one another and consequently a predetermined sequencing of the individual color components.

It is one configuration that a plurality of phosphor wheels are arranged optically in series downstream of the light generating device. This may, in particular, mean in at least one rotational position of the phosphor wheels that the phosphor wheels are arranged in series in a light path of the primary light generated by the light generating device. In this way, apart from the second or further phosphor wheel, no other component is necessary in order to distribute the primary radiation over the individual phosphor wheels.

Alternatively, the light generating device may comprise one or more beam splitters, in order to split the light path into a plurality of branches or paths.

It is also a configuration that the plurality of phosphor wheels are arranged in series one behind the other and respectively comprise different phosphors. In this way, a temperature dependency of the phosphors may be taken into account particularly simply.

It is one configuration thereof that at least one phosphor having a relatively low temperature dependency is present on at least one of the plurality of phosphor wheels, and a phosphor having a relatively high temperature dependency (for example a nitridic 'red' phosphor) is present on at least one other of the plurality of phosphor wheels. Consequently, a plurality of thermally relatively insensitive phosphors can be arranged on one phosphor wheel, which reduces a number of the phosphor wheels.

Alternatively, a distribution of the phosphors over different phosphor wheels may include at least one phosphor being distributed over different phosphor wheels, i.e. at least two phosphor wheels comprise the same phosphor. This makes particularly effective cooling of such a phosphor possible.

It is another configuration that the phosphor wheels are configured and arrangeable in such a way that, in at least one corresponding rotational position of the phosphor wheels, the primary light strikes a phosphor of a respective one of the phosphor wheels. In this way, each of the phosphors of the phosphor wheels can be exposed to primary light. This may, in particular, be achieved in that, in order to expose a phosphor wheel which is arranged downstream of at least one other (upstream) phosphor wheel, in the case of the at least one upstream phosphor wheel the primary light can shine through a transmission region which is transmissive for the primary light, or it can be rotated into the light path of the primary light. In other words, the primary light may shine through the upstream phosphor wheels (without wavelength conversion).

A transmission region may be formed by a free or open region in the phosphor wheel, for example a slit in the shape of a sector of a ring, or by a cover which is transmissive for the primary light, for example a transparent plate or sheet.

According to yet another configuration, in a transmission rotational position, the primary light can shine through the phosphor wheels without wavelength conversion. In this way, the primary light can be provided as a light component of the combination light in a particularly straightforward way.

It is furthermore a configuration that the primary light has a visible spectral range, in particular blue light. The primary light may be used as a light component of the combination light and, in particular, as blue primary light has a high energy so that secondary light in a large spectral range can be generated by phosphors.

It is another refinement that the primary light is blue light (for example with a wavelength of 460 nm), and a 'red' phosphor converts the blue primary light into red secondary light and a 'green' phosphor converts the blue primary light into green secondary light. In this way, a (sequential) sum colored light consisting of red, green and blue color components, and therefore a large color space or gamut, is provided. The green phosphor and the red phosphor may, in particular, be arranged on different phosphor wheels, or phosphor regions thereof. The lighting apparatus is not, however, restricted thereto, and other or additional dyes or color components may be provided, for example additionally a ('yellow') dye which converts the blue primary light into yellow secondary light.

The additional provision of a 'yellow' dye assists stabilization of a white point, an overall efficiency and the yellow to red spectral component with more lumens.

It is furthermore a configuration that the primary light cannot shine through the phosphor wheels without wavelength conversion in any rotational position. In this way, a lighting apparatus in which the primary light does not form a component of the combination light can be implemented in a particularly straightforward way.

It is one refinement thereof that the primary light includes blue light, in particular with a wavelength of 405 nm or 445 nm. Blue light of from 440 to 460 nm, in particular 445 nm, is very energetic and can be produced relatively simply by InGaN lasers with a high power and efficiency. This refinement also includes the use of a blue primary light with a wavelength of 405 nm or any use of (at least) three phosphors, for example a 'blue' phosphor which converts the blue primary light of the wavelength 405 nm into blue secondary light with a wavelength of 460 nm, a red phosphor and a green phosphor.

It is another refinement thereof that the primary light includes UV light, and the lighting apparatus includes, for example, phosphor wheels with corresponding blue, red and green phosphors.

It is yet another refinement that the phosphors are arranged on respective phosphor wheels; thus, the blue, red and green phosphors on three phosphor wheels. This allows particularly good thermal dissipation from the phosphors.

It is an alternative refinement that a thermally relatively insensitive (for example blue, yellow and/or green) dye is arranged on a common dye wheel, and a thermally more sensitive (for example red, in particular nitridic) phosphor is arranged on another color wheel as the only phosphor there. This allows sufficient cooling of all the phosphors with a small number of phosphor wheels.

The light generating device is, in particular, continuously operable, which allows a particularly high light flux or brightness. The light generating device may, however, be operable in pulsed or cycled mode.

It is also a configuration that the light generating device includes at least one laser light source. This allows a high beam intensity and has a compact structure and long lifetime. Furthermore, the primary light (pump light) generated thereby is very precisely reproducible. The at least one laser light source may, in particular, comprise at least one laser diode.

The light generating device is not, however, restricted to the use of at least one laser as the light source, but may for example also include at least one other semiconductor light source, such as an LED. It is also possible, for example, to use a broadband light source with a downstream spectral filter.

It is an advantageous configuration for simple and compact extraction of the secondary light that a dichroic mirror is arranged upstream of at least one phosphor wheel, and in particular each phosphor wheel, which is formed to be transmissive for the light, in particular primary light, striking this phosphor wheel, and reflective for the secondary light wavelength-converted by the at least one phosphor of this phosphor wheel.

It is yet another configuration that the lighting apparatus is a projector or a part of a projector.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1 shows a lighting apparatus in accordance with various embodiments.

DETAILED DESCRIPTION

The following detailed description refers to the accompanying drawing that shows, by way of illustration, specific details and embodiments in which the disclosure may be practiced.

FIG. 1 outlines a lighting apparatus 11 having a light generating device 12. The light generating device 12 may constitute, for example, a part of a projector. The light generating device 12 includes at least one semiconductor light source in the form of at least one laser diode 13 (for example a laser array with downstream collimation optics), which can emit blue primary light B with a peak wavelength of about 440 to 460 nm. The blue primary light B strikes a first dichroic, in particular dielectric, mirror 14, which is transmissive at least for the blue primary light B. After passing through the first dichroic mirror 14, the primary light B strikes first focusing optics including two lenses 15, 16, which focus the blue primary light B onto a first phosphor wheel 17. The first phosphor wheel 17 is thus arranged optically downstream of the light generating device 12.

The first phosphor wheel 17 includes a circular substrate 18, which can be rotated by means of a centrally arranged driveshaft 19, in particular with a constant speed of revolution or rotational speed. On the substrate 18, there are at least two approximately semicircular segments 20, 21 (arranged frontally thereover), which are exposed to the (focused) blue primary light B during rotation of the phosphor wheel 17. Owing to the rotation of the phosphor wheel 17, a light spot of the blue primary light B passes in the form of a circle arc over the segments 20, 21.

A first of the segments 20, 21 is formed as a 'green' phosphor region 20 which includes "green" phosphor, in particular for full conversion of the blue primary light B into green secondary light G, on the side of the substrate 18 facing toward the first dichroic mirror 14 and the focusing optics 15, 16. The green secondary light G is shone back through the first focusing optics 15, 16 onto the first dichroic mirror 14. The first dichroic mirror 14 is formed to be specularly reflective for the green secondary light G and, owing to its oblique position, it extracts the green secondary light G laterally with respect to a light path defined by the blue primary light B, for example onto a first deviating mirror 22.

A second of the segments 20, 21 is formed as a transmission region 21, which transmits the blue primary light B. The transmission region 21 may, for example, be formed as an arc-shaped slit, so that losses are avoided. In a suitable angular position of the phosphor wheel 17, the blue primary light B thus passes through the transmission region 21 and strikes beam expander optics, formed by two lenses 23, 24, for expanding and collinearizing the blue primary light B previously focused onto the phosphor wheel 17.

The now re-expanded blue primary light B then passes through a second dichroic mirror 25, which is transmissive for the blue primary light B. The primary light B subsequently strikes second focusing optics including two lenses 26, 27, which focus the blue primary light B onto a second phosphor wheel 28. The second phosphor wheel 28 is thus arranged optically downstream of both the light generating device 12 and the first phosphor wheel 17, and is arranged optically in series with the first phosphor wheel 17.

The second phosphor wheel 28 likewise includes two segments 29, 30 (represented frontally thereover) in the shape of sectors of a ring, which are exposed to the (then refocused) blue primary light B during rotation of the second phosphor wheel 28. The second phosphor wheel 28 furthermore includes an untuned region, which for example directly includes the substrate 18.

A first of the segments 29, 30 is formed as a "red" phosphor region 29, which includes "red" phosphor, in particular for full conversion of the blue primary light B into red secondary light R, on the side of the substrate 18 facing toward the second dichroic mirror 25 and the focusing optics 26, 27. The red secondary light R is shone back through the focusing optics 26, 27 onto the second dichroic mirror 25. The second dichroic mirror 25 is formed to be specularly reflective for the red secondary light R and, owing to its oblique position, it extracts it laterally with respect to a light path P defined by the blue primary light B, for example onto a third dichroic mirror 31 which is formed so as to be reflective for the red secondary light R.

A second of the segments 29, 30 is formed as a transmission region 30, which transmits the blue primary light B. The transmission region 30 may, for example, be formed as an arc-shaped slit. In a suitable angular position of the phosphor wheel 28, the blue primary light B thus passes through the transmission region 30 and strikes beam expander optics, formed by a lens 32, for expanding the blue primary light B previously focused onto the second phosphor wheel 28. The expanded blue primary light B then strikes a second deviating mirror 33, which directs the blue primary light B further onto a fourth dichroic mirror 34, which is formed so as to be reflective for the blue primary light B.

The deviating mirror 22 and the dichroic mirrors 31 and 34 form a beam combiner device, the effect of which is that an output light beam E obtained behind the fourth dichroic mirror 34 is composed of an equally directed (sequential) combination of the green secondary light G, the red secondary light R and the blue primary light B. To this end, the third dichroic mirror 31 is transmissive at least for the green secondary light G, and the fourth dichroic mirror 34 is transmissive at least for the green secondary light G and the red secondary light R.

Owing to the decoupling of the 'green' phosphor of the green phosphor region 20 from the 'red' phosphor of the red phosphor region 29, the second phosphor wheel 28 can be used exclusively for thermal dissipation from the 'red' phosphor, so that the thermally sensitively reacting red phosphor (i.e. with a large temperature dependency of its conversion behavior) can better keep its conversion efficiency at a high level. Power scaling of the output light beam E is thus also assisted.

During operation of the lighting apparatus 11, the at least one laser diode 13 is operated in continuous-wave mode, which is readily possible owing to the effective thermal dissipation from the red phosphor. The phosphor wheels 17 and 28 are rotated with the same rotational speed and consequently a fixed rotational angle with respect to one another.

In a first angular or rotational position or rotational position range, the green phosphor region 20 of the phosphor wheel 17 lies in the light path of the blue primary light B and is consequently exposed to the blue primary light B. As already described above, green secondary light G is then emitted by the lighting apparatus 11.

When the phosphor wheels 17 and 28 are rotated further, the transmission region 21 enters the light path of the blue primary light B, and at the same time the red phosphor region 29 lies in the light path of the blue primary light B (second rotational position). Consequently, the red phosphor region 29 is exposed to the blue primary light B, and consequently red secondary light R is emitted by the lighting apparatus 11.

When the phosphor wheels 17 and 28 rotate even further, the transmission region 21 of the phosphor wheel 17 remains in the light path of the blue primary light B, and simultaneously the transmission region 30 of the phosphor wheel 28 comes into the light path of the blue primary light B (third rotational position, or transmission rotational position). Consequently, the blue primary light B is shone through the phosphor wheels 17 and 28 without wavelength conversion and is emitted by the lighting apparatus 11.

The output light beam E is consequently composed of a sequential combination of the green secondary light G, red secondary light R and blue primary light B, which with a sufficiently rapid sequencing is perceived as mixed combination light, or mixed light, by the human eye. A proportion in the mixed light is proportional to the (arc) length of the phosphor regions, and here corresponds at least approximately to a ratio G:R:B of ½:¼:¼.

Although the invention has been illustrated in further detail and described by the exemplary embodiment shown, the invention is not restricted thereto and other variants may be derived therefrom by the person skilled in the art, without departing from the protective scope of the invention.

For instance, the primary light may not be extracted into the output light beam E, for example if the primary UV light or blue light has a wavelength of about 405 nm. In particular, it may then be advantageous that the primary light cannot shine through the phosphor wheels without wavelength conversion in any rotational position.

Instead of this, for example, in a similar way to the phosphor wheels shown, an additional phosphor wheel with an upstream dichroic mirror (and optionally other elements such as focusing optics, etc.) may be provided, in which case this light wheel may for example carry a blue phosphor and consequently a blue phosphor region, which can convert the primary light into desired blue secondary light (for example with a wavelength of about 460 nm).

Alternatively, a part of the transmission region 21 on the first phosphor wheel 17 may be formed as a 'blue' phosphor region. The upstream first dichroic mirror 14 should then also be formed to be reflective for the blue secondary light, and the third dichroic mirror 31 should be formed so as to be transmissive for the blue secondary light. The second deviating mirror 33 and the fourth dichroic mirror 34 may then be obviated.

In general, the lengths, or arc lengths, of the phosphor regions (for example 20, 29) and/or transmission regions (for example 21, 30) may be adapted to one another, for example depending on the desired application. For example, phosphor regions and/or transmission regions may be repeated on a phosphor wheel, or divided into a plurality of separated subregions. For example, on the first phosphor wheel 17, the regions 20 and 21 may be configured in such a way that they do not cover a full circle circumference of 360°, but for example only 90°, and may then be repeated in this way four times in succession, so that they again completely cover a full circle. The structure of the further phosphor wheels arranged downstream may be modified correspondingly. In this way, with a constant rotational frequency of the color wheels, the color sequence of the mixed light can be shortened and an image refresh frequency can consequently be increased.

The lighting apparatus is in general not restricted to the provision of only one light generating device, and may also comprise two or more light generating devices. Also, more than one primary light beam may be shone onto the phosphor wheels by means of the at least one light generating device, specifically also from different directions.

It may thus be a further general refinement that the lighting apparatus 11 is for example 'doubled' insofar as a second light generating device 12' is arranged mirror-symmetrically with respect to the first light generating device 12, in such a way that primary radiation is shone onto the phosphor wheels from the other side. Alternatively, this may be achieved by beam splitting of the primary light beam generated by only one light generating device.

By exposure on both sides, a particularly high radiation intensity of the lighting apparatus can advantageously be achieved. In particular, a phosphor wheel which includes thermally less sensitive phosphor, for example green and blue phosphor, may be exposed on both sides. A more uniform heating of the phosphor wheel from both sides may furthermore be achieved by exposure on both sides. Furthermore, it is also possible to spatially separate two or more color spaces, for example by providing one phosphor on one side and another phosphor on another side of the same phosphor wheel.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting apparatus, comprising:
   at least one light generating device for generating primary light, and
   at least one phosphor wheel arranged optically downstream of the light generating device, the phosphor wheel comprising at least one phosphor for wavelength conversion of the primary light into secondary light,
   wherein a plurality of phosphor wheels are arranged optically in series downstream of the light generating device.

2. The lighting apparatus as claimed in claim 1, wherein the plurality of phosphor wheels are arranged in series one behind the other and respectively comprise different phosphors.

3. The lighting apparatus as claimed in claim 2, wherein at least one phosphor having a relatively low temperature dependency is present on at least one of the plurality of phosphor wheels, and at least one phosphor having a relatively high temperature dependency is present on at least one other of the plurality of phosphor wheels.

4. The lighting apparatus as claimed in claim 3, wherein the phosphor wheels are configured and arrangeable in such a way that, in at least one corresponding rotational position of the phosphor wheels, the primary light strikes a phosphor of a respective one of the phosphor wheels.

5. The lighting apparatus as claimed in claim 3, wherein, in a transmission rotational position, the primary light can shine through the phosphor wheels without wavelength conversion.

6. The lighting apparatus as claimed in claim 3, wherein the primary light cannot shine through the phosphor wheels without wavelength conversion in any rotational position.

7. The lighting apparatus as claimed in claim 6, wherein the primary light comprises UV light.

8. The lighting apparatus as claimed in claim 2, wherein the phosphor wheels are configured and arrangeable in such a way that, in at least one corresponding rotational position of the phosphor wheels, the primary light strikes a phosphor of a respective one of the phosphor wheels.

9. The lighting apparatus as claimed in claim 8, wherein, in a transmission rotational position, the primary light can shine through the phosphor wheels without wavelength conversion.

10. The lighting apparatus as claimed in claim 8, wherein the primary light cannot shine through the phosphor wheels without wavelength conversion in any rotational position.

11. The lighting apparatus as claimed in claim 10, wherein the primary light comprises UV light.

12. The lighting apparatus as claimed in claim 2, wherein, in a transmission rotational position, the primary light can shine through the phosphor wheels without wavelength conversion.

13. The lighting apparatus as claimed in claim 12, wherein the primary light has a visible spectral range.

14. The lighting apparatus as claimed in claim 2, wherein the primary light cannot shine through the phosphor wheels without wavelength conversion in any rotational position.

15. The lighting apparatus as claimed in claim 14, wherein the primary light comprises UV light.

16. The lighting apparatus as claimed in claim 1, wherein the light generating device comprises at least one laser light source.

17. The lighting apparatus as claimed in claim 1, wherein a dichroic mirror is arranged upstream of the at least one phosphor wheel, which is formed to be transmissive for the primary light, striking the phosphor wheel, and reflective for the secondary light wavelength-converted by the at least one phosphor of the phosphor wheel.

18. The lighting apparatus as claimed in claim 1, wherein the lighting apparatus is a projector or a part of a projector.

* * * * *